(12) United States Patent
Aoki

(10) Patent No.: US 11,249,290 B2
(45) Date of Patent: Feb. 15, 2022

(54) ZOOM LENS AND IMAGE PICKUP APPARATUS INCLUDING THE SAME

(71) Applicant: CANON KABUSHIKI KAISHA, Tokyo (JP)

(72) Inventor: Koji Aoki, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 147 days.

(21) Appl. No.: 16/825,924

(22) Filed: Mar. 20, 2020

(65) Prior Publication Data
US 2020/0310089 A1 Oct. 1, 2020

(30) Foreign Application Priority Data
Mar. 26, 2019 (JP) .............................. JP2019-057699

(51) Int. Cl.
| | | |
|---|---|---|
| G02B 15/14 | (2006.01) | |
| G02B 27/00 | (2006.01) | |
| G02B 15/177 | (2006.01) | |
| G02B 15/20 | (2006.01) | |
| G02B 13/00 | (2006.01) | |
| H04N 5/225 | (2006.01) | |
| G02B 9/34 | (2006.01) | |
| H04N 5/232 | (2006.01) | |
| G02B 27/64 | (2006.01) | |

(52) U.S. Cl.
CPC ....... *G02B 15/144105* (2019.08); *G02B 9/34* (2013.01); *G02B 13/004* (2013.01); *G02B 13/009* (2013.01); *G02B 15/145105* (2019.08); *G02B 15/145121* (2019.08); *G02B 15/177* (2013.01); *G02B 15/20* (2013.01); *G02B 27/0025* (2013.01); *G02B 27/646* (2013.01); *H04N 5/2254* (2013.01); *H04N 5/23296* (2013.01); *G02B 15/1461* (2019.08)

(58) Field of Classification Search
CPC .............. G02B 27/0025; G02B 27/646; G02B 15/1461; G02B 15/1451; G02B 15/145105; G02B 15/145121; G02B 15/20; G02B 15/144105
USPC ......................................................... 359/686
See application file for complete search history.

(56) References Cited

U.S. PATENT DOCUMENTS

| | | | | |
|---|---|---|---|---|
| 8,405,915 B2 * | 3/2013 | Hayakawa | ......... | G02B 15/1461 359/676 |
| 8,611,016 B2 * | 12/2013 | Imaoka | .............. | G02B 15/1461 359/684 |
| 10,432,870 B2 * | 10/2019 | Yamazoe | .............. | G02B 13/009 |

FOREIGN PATENT DOCUMENTS

JP    H11-202202 A    7/1999

* cited by examiner

*Primary Examiner* — Kristina M Deherrera
(74) *Attorney, Agent, or Firm* — Canon U.S.A., Inc. IP Division

(57) ABSTRACT

Provided is a zoom lens including, in order from an object side to an image side, a first lens unit having a positive refractive power, a second lens unit having a negative refractive power, a third lens unit having a positive refractive power, and a fourth lens unit having a negative refractive power. In the zoom lens, an interval between each pair of adjacent lens units is changed during zooming, and the first lens unit is configured not to move for zooming. Further, a total length DT of the zoom lens at a telephoto end, a focal length fT of the zoom lens at the telephoto end, a distance BW of a back focus at a wide-angle end, a total length DW of the zoom lens at the wide-angle end, and a focal length f3 of the third lens unit are each appropriately set.

20 Claims, 13 Drawing Sheets

ZOOM LENS AND IMAGE PICKUP APPARATUS INCLUDING THE SAME

BACKGROUND OF THE INVENTION

Field of the Invention

The aspect of the embodiments relates to a zoom lens and an image pickup apparatus including the same, which are suitable for an image pickup optical system to be used with an image pickup apparatus using an image pickup element, such as a video camera, an electronic still camera, a broadcasting camera, or a monitoring camera.

Description of the Related Art

It is required of an image pickup optical system to be used with image pickup apparatus to be a zoom lens having a short total length (distance from the first lens surface to an image plane), being compact as the entire system of the zoom lens, and having a high zoom ratio and high optical performance over the entire zoom range. As a zoom lens satisfying those requirements, there is known a positive-lead type zoom lens, in which a lens unit having a positive refractive power is arranged closest to an object side (Japanese Patent Application Laid-Open No. H11-202202).

In Japanese Patent Application Laid-Open No. H11-202202, the zoom lens consists of, in order from the object side to an image side, a first lens unit having a positive refractive power, a second lens unit having a negative refractive power, a third lens unit having a positive refractive power, and a fourth lens unit having a negative refractive power.

SUMMARY OF THE INVENTION

According to at least one embodiment of the disclosure, there is provided a zoom lens including, in order from an object side to an image side: a first lens unit having a positive refractive power; a second lens unit having a negative refractive power; a third lens unit having a positive refractive power; and a fourth lens unit having a negative refractive power, wherein an interval between each pair of adjacent lens units is changed during zooming, wherein the first lens unit is configured not to move for zooming, and wherein the following inequalities are satisfied:

$$0.30 < DT/fT < 0.85;$$

$$0.02 < BW/DW < 0.14; \text{ and}$$

$$0.145 < f3/fT < 0.450,$$

where DT is a total length of the zoom lens at a telephoto end, fT is a focal length of the zoom lens at the telephoto end, BW is a distance of a back focus at a wide-angle end, DW is a total length of the zoom lens at the wide-angle end, and f3 is a focal length of the third lens unit.

According to at least one embodiment of the disclosure, there is provided an image pickup apparatus including: a zoom lens; and an image pickup element configured to receive an optical image formed through the zoom lens, the zoom lens including, in order from an object side to an image side: a first lens unit having a positive refractive power; a second lens unit having a negative refractive power; a third lens unit having a positive refractive power; and a fourth lens unit having a negative refractive power, wherein an interval between each pair of adjacent lens units is changed during zooming, wherein the first lens unit is configured not to move for zooming, and wherein the following inequalities are satisfied:

$$0.30 < DT/fT < 0.85;$$

$$0.02 < BW/DW < 0.14; \text{ and}$$

$$0.145 < f3/fT < 0.450,$$

where DT is a total length of the zoom lens at a telephoto end, fT is a focal length of the zoom lens at the telephoto end, BW is a distance of a back focus at a wide-angle end, DW is a total length of the zoom lens at the wide-angle end, and f3 is a focal length of the third lens unit.

Further features of the disclosure will become apparent from the following description of exemplary embodiments with reference to the attached drawings.

DESCRIPTION OF THE EMBODIMENTS

Now, exemplary embodiments of the disclosure are described with reference to the attached drawings.

The zoom lens of each of Embodiment of the disclosure includes, in order from an object side to an image side, a first lens unit having a positive refractive power, a second lens unit having a negative refractive power, a third lens unit having a positive refractive power, and a fourth lens unit having a negative refractive power. An interval between each pair of adjacent lens units is changed during zooming. The first lens unit is configured not to move for zooming.

Figure 1:
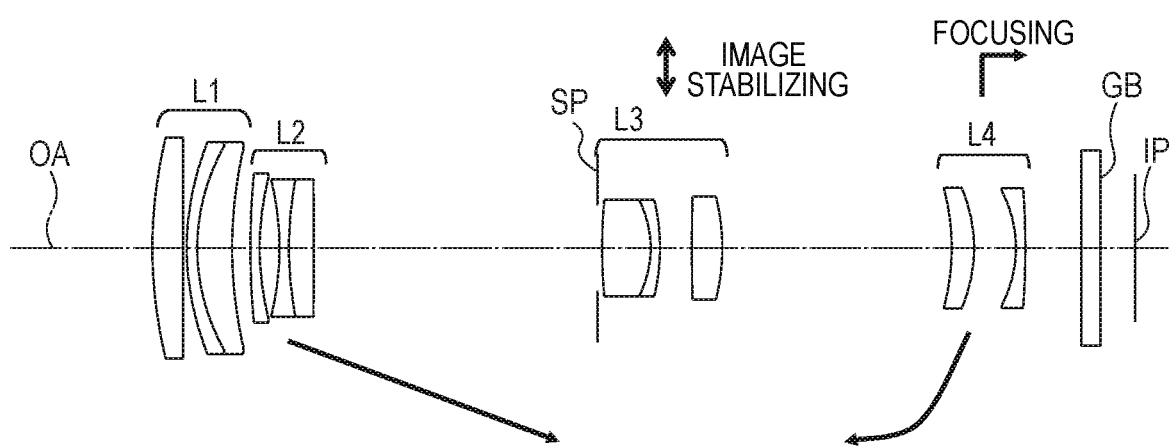
FIG. 1 is a lens cross-sectional view of a zoom lens according to Embodiment 1 of the disclosure at a wide-angle end.

FIG. 1 is a lens cross-sectional view of a zoom lens according to Embodiment 1 of the disclosure at a wide-angle end.

Figure 2A:
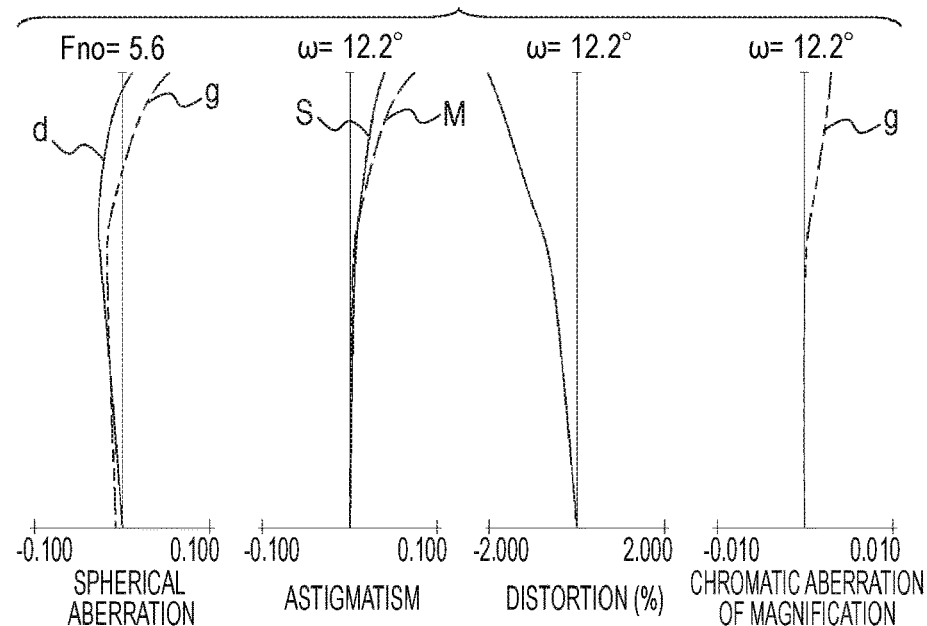
FIG. 2A is a longitudinal aberration diagram of Embodiment 1 at the wide-angle end.
Figure 2B:
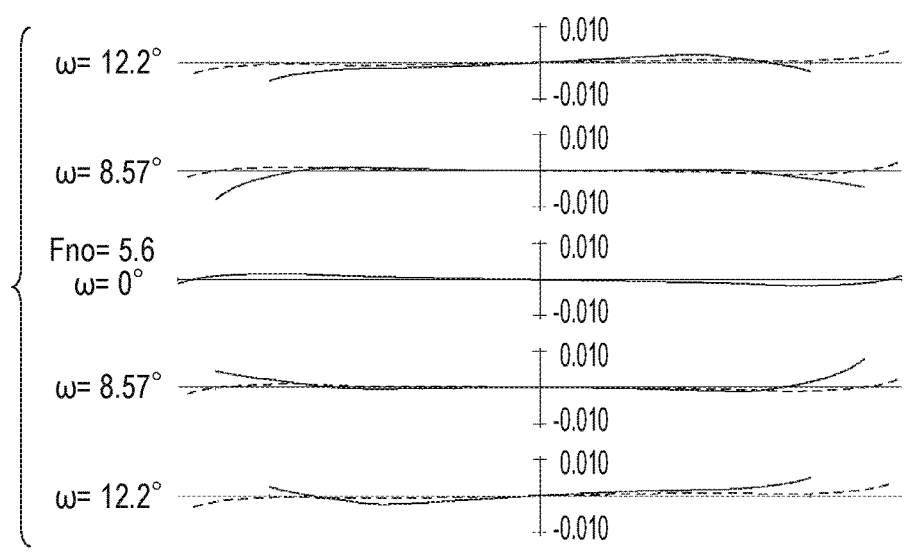
FIG. 2B is a lateral aberration diagram of Embodiment 1 at the wide-angle end.
Figure 2C:
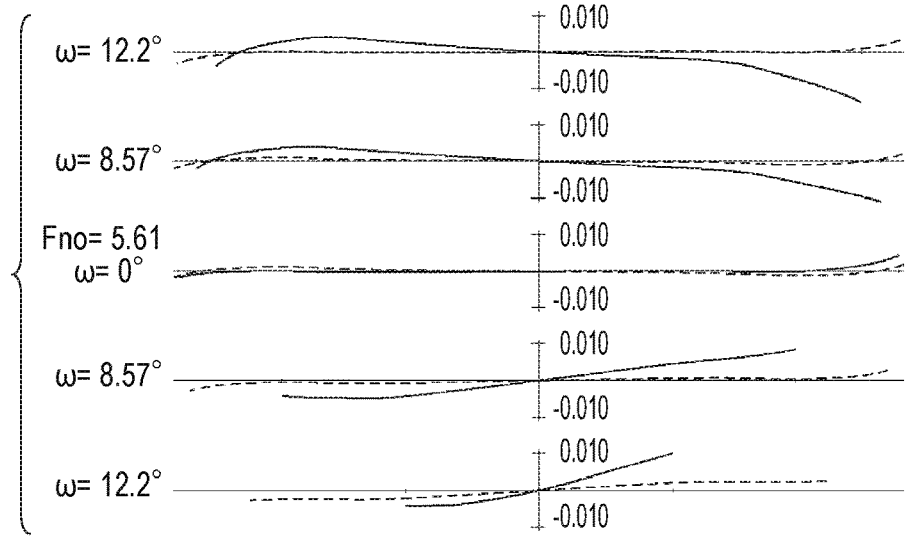
FIG. 2C is a lateral aberration diagram of Embodiment 1 at the wide-angle end obtained during image stabilization with an image stabilization angle of −3.0 degrees.

FIG. 2A, FIG. 2B, and FIG. 2C are a longitudinal aberration diagram of Embodiment 1 (Numerical Data 1) of the disclosure at the wide-angle end, a lateral aberration diagram of Embodiment 1 at the wide-angle end, and a lateral aberration diagram of Embodiment 1 at the wide-angle end obtained during image stabilization with an image stabilization angle of −3.0 degrees, respectively.

Figure 3A:
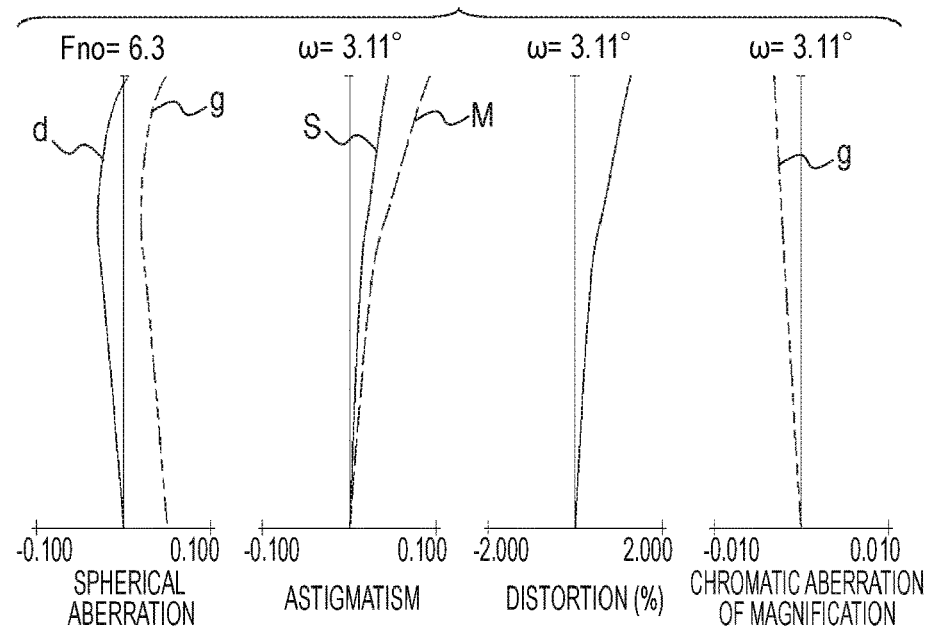
FIG. 3A is a longitudinal aberration diagram of Embodiment 1 at a telephoto end.
Figure 3B:
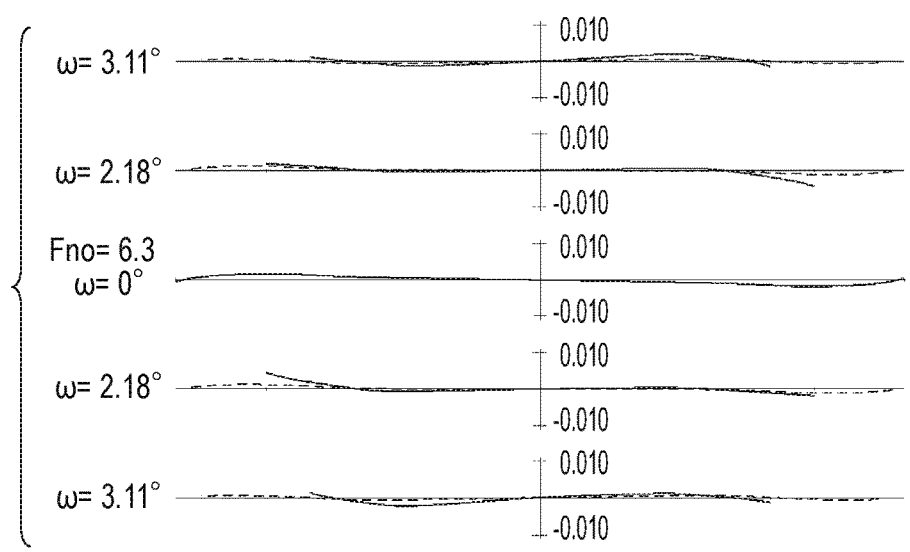
FIG. 3B is a lateral aberration diagram of Embodiment 1 at the telephoto end.
Figure 3C:
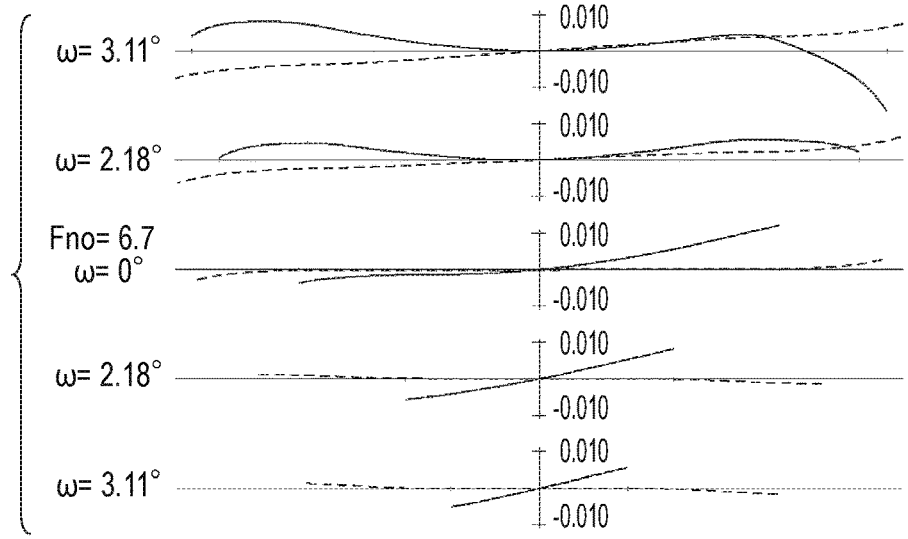
FIG. 3C is a lateral aberration diagram of Embodiment 1 at the telephoto end obtained during image stabilization with an image stabilization angle of −1.5 degrees.

FIG. 3A, FIG. 3B, and FIG. 3C are a longitudinal aberration diagram of Embodiment 1 (Numerical Data 1) of the disclosure at a telephoto end, a lateral aberration diagram of Embodiment 1 at the telephoto end, and a lateral aberration diagram of Embodiment 1 at the telephoto end obtained during image stabilization with an image stabilization angle of −1.5 degrees, respectively. Embodiment 1 relates to a zoom lens having a zoom ratio of 3.97 and an aperture ratio of from about 5.60 to about 6.30.

Figure 4:
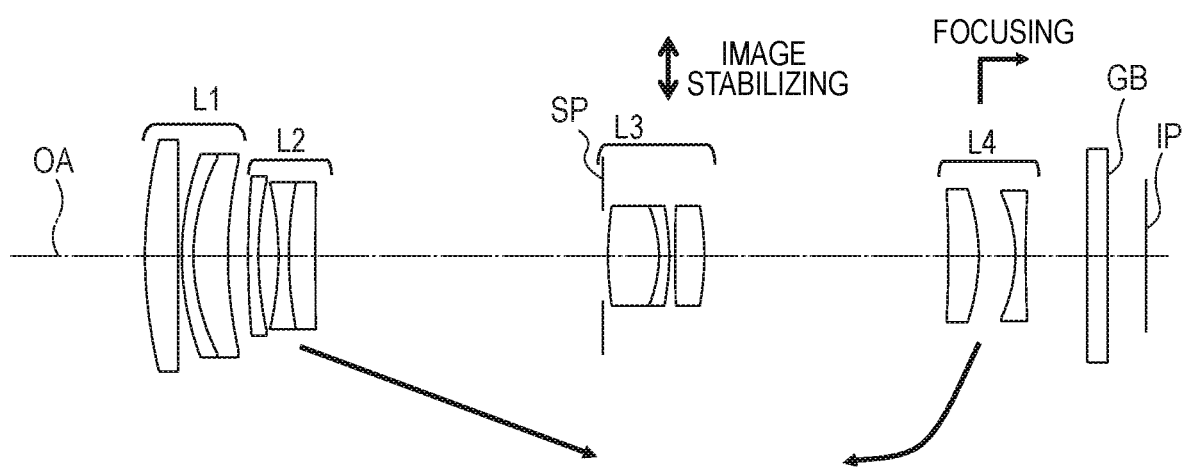
FIG. 4 is a lens cross-sectional view of a zoom lens according to Embodiment 2 of the disclosure at a wide-angle end.

FIG. 4 is a lens cross-sectional view of a zoom lens according to Embodiment 2 of the disclosure at a wide-angle end.

Figure 5A:
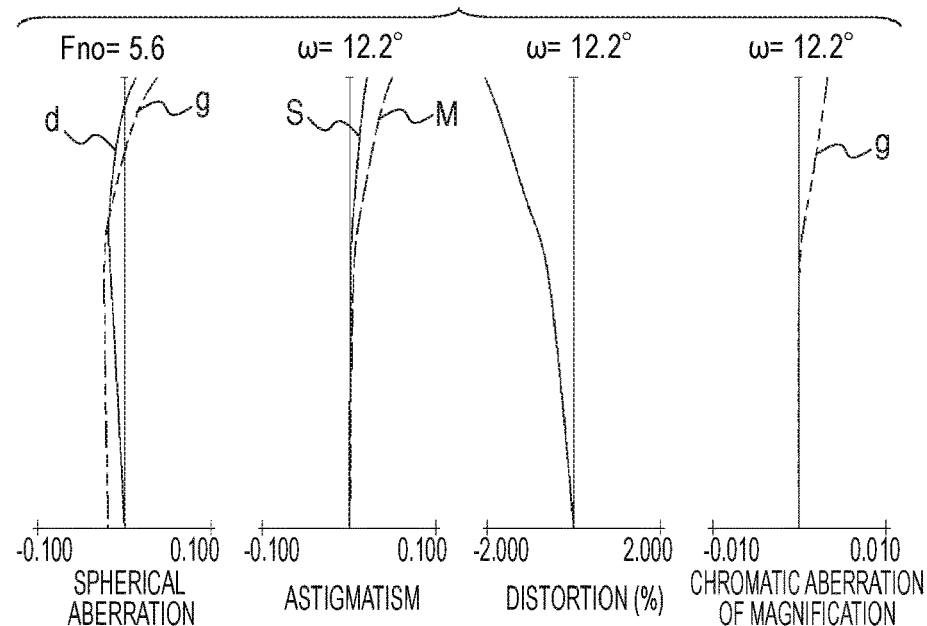
FIG. 5A is a longitudinal aberration diagram of Embodiment 2 at the wide-angle end.
Figure 5B:
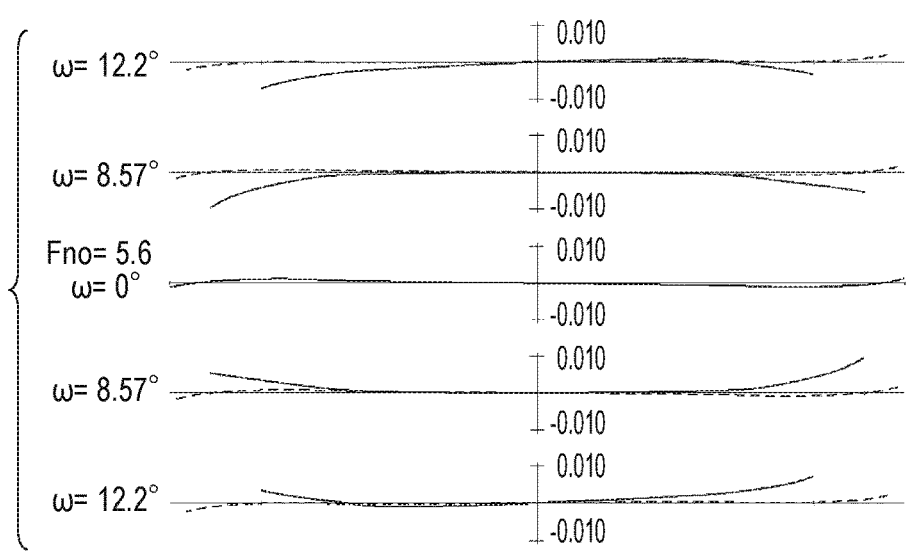
FIG. 5B is a lateral aberration diagram of Embodiment 2 at the wide-angle end.
Figure 5C:
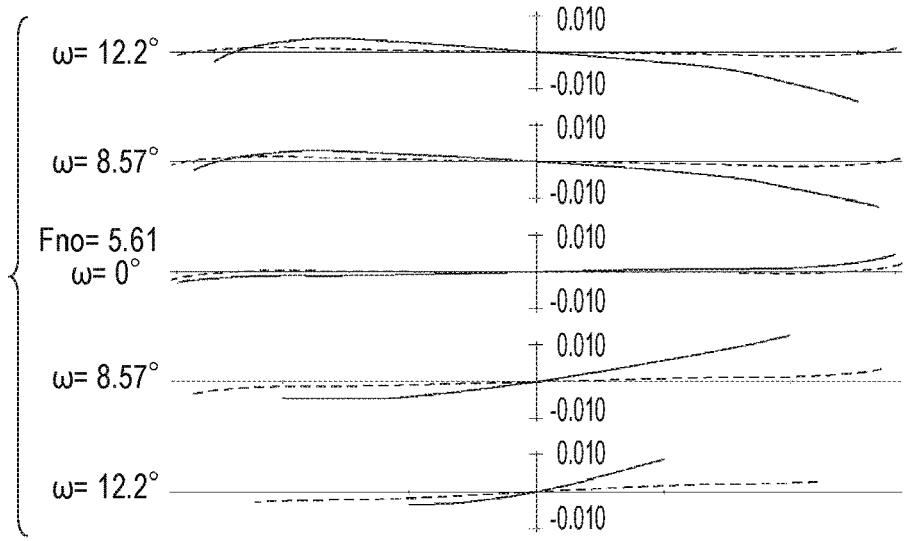
FIG. 5C is a lateral aberration diagram of Embodiment 2 at the wide-angle end obtained during image stabilization with an image stabilization angle of −3.0 degrees.

FIG. 5A, FIG. 5B, and FIG. 5C are a longitudinal aberration diagram of Embodiment 2 (Numerical Data 2) of the disclosure at the wide-angle end, a lateral aberration diagram of Embodiment 2 at the wide-angle end, and a lateral aberration diagram of Embodiment 2 at the wide-angle end obtained during image stabilization with an image stabilization angle of −3.0 degrees, respectively.

Figure 6A:
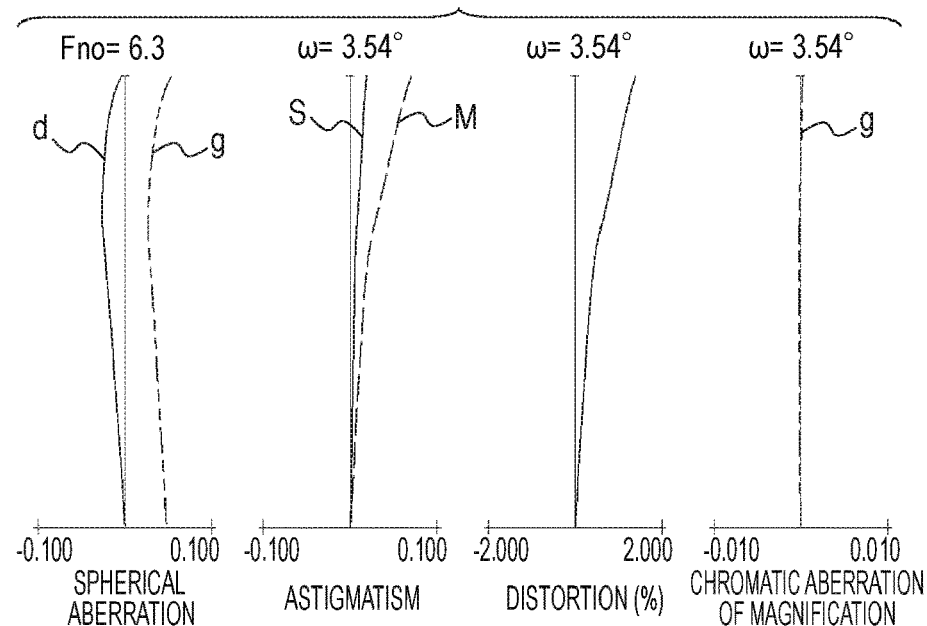
FIG. 6A is a longitudinal aberration diagram of Embodiment 2 at a telephoto end.
Figure 6B:
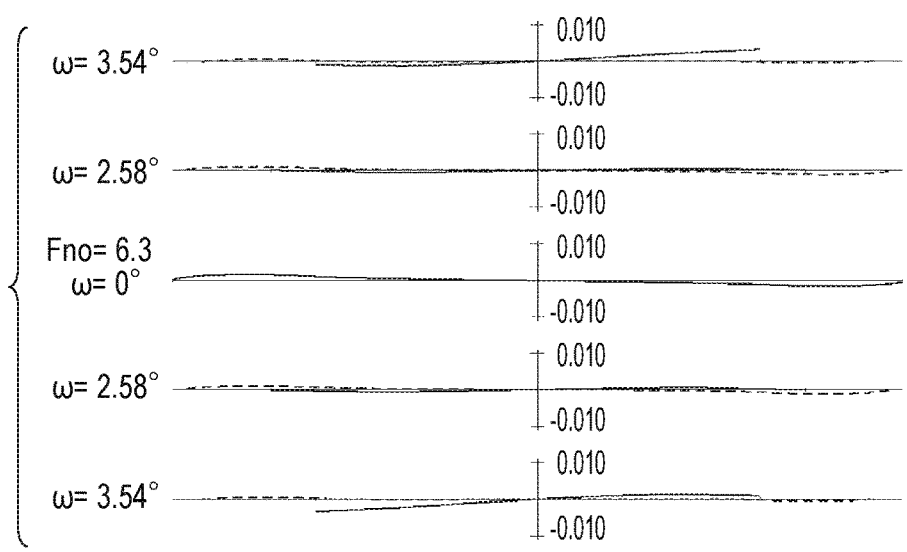
FIG. 6B is a lateral aberration diagram of Embodiment 2 at the telephoto end.
Figure 6C:
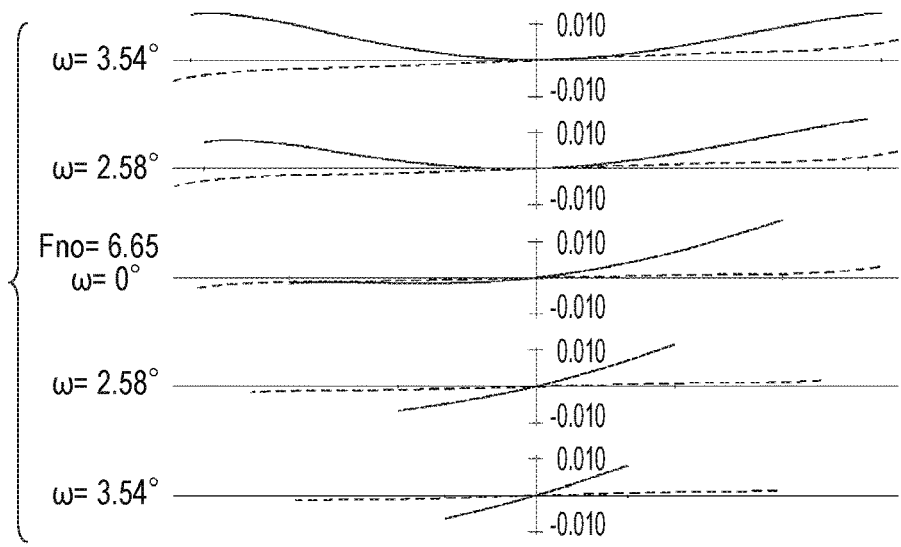
FIG. 6C is a lateral aberration diagram of Embodiment 2 at the telephoto end obtained during image stabilization with an image stabilization angle of −1.5 degrees.

FIG. 6A, FIG. 6B, and FIG. 6C are a longitudinal aberration diagram of Embodiment 2 (Numerical Data 2) of the disclosure at a telephoto end, a lateral aberration diagram of Embodiment 2 at the telephoto end, and a lateral aberration diagram of Embodiment 2 at the telephoto end obtained during image stabilization with an image stabilization angle of −1.5 degrees, respectively. Embodiment 2 relates to a zoom lens having a zoom ratio of 3.48 and an aperture ratio of from about 5.60 to about 6.30.

Figure 7:
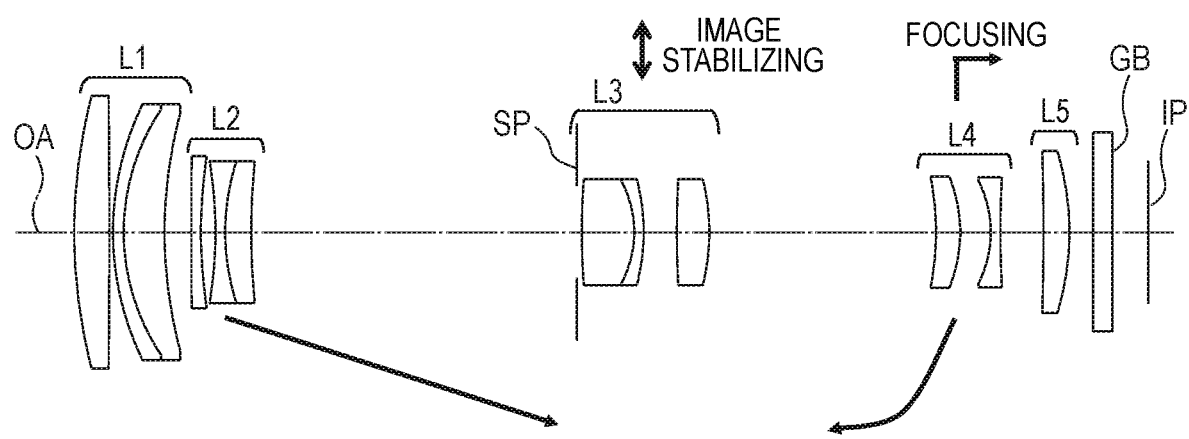
FIG. 7 is a lens cross-sectional view of a zoom lens according to Embodiment 3 of the disclosure at a wide-angle end.

FIG. 7 is a lens cross-sectional view of a zoom lens according to Embodiment 3 of the disclosure at a wide-angle end.

Figure 8A:
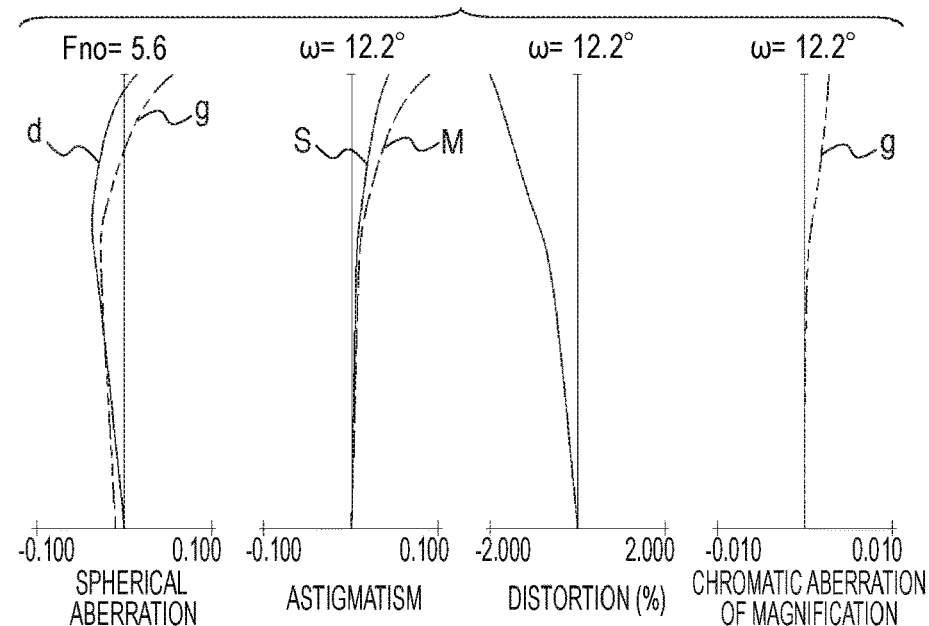
FIG. 8A is a longitudinal aberration diagram of Embodiment 3 at the wide-angle end.
Figure 8B:
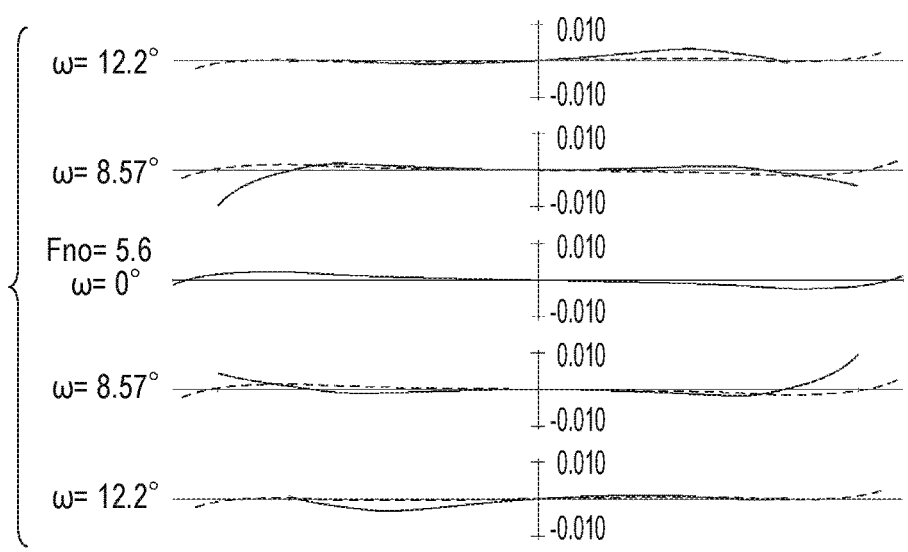
FIG. 8B is a lateral aberration diagram of Embodiment 3 at the wide-angle end.
Figure 8C:
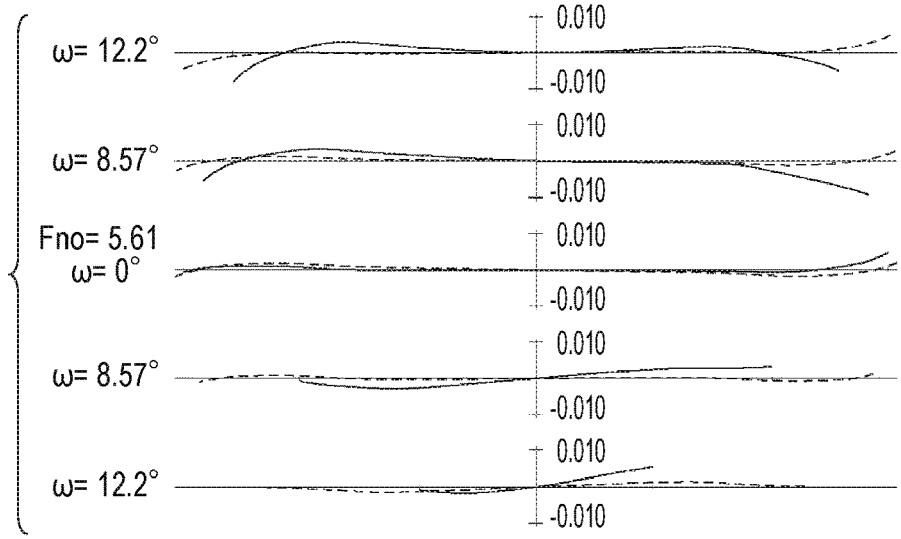
FIG. 8C is a lateral aberration diagram of Embodiment 3 at the wide-angle end obtained during image stabilization with an image stabilization angle of −3.0 degrees.

FIG. 8A, FIG. 8B, and FIG. 8C are a longitudinal aberration diagram of Embodiment 3 (Numerical Data 3) of the disclosure at the wide-angle end, a lateral aberration diagram of Embodiment 3 at the wide-angle end, and a lateral aberration diagram of Embodiment 3 at the wide-angle end obtained during image stabilization with an image stabilization angle of −3.0 degrees, respectively.

Figure 9A:
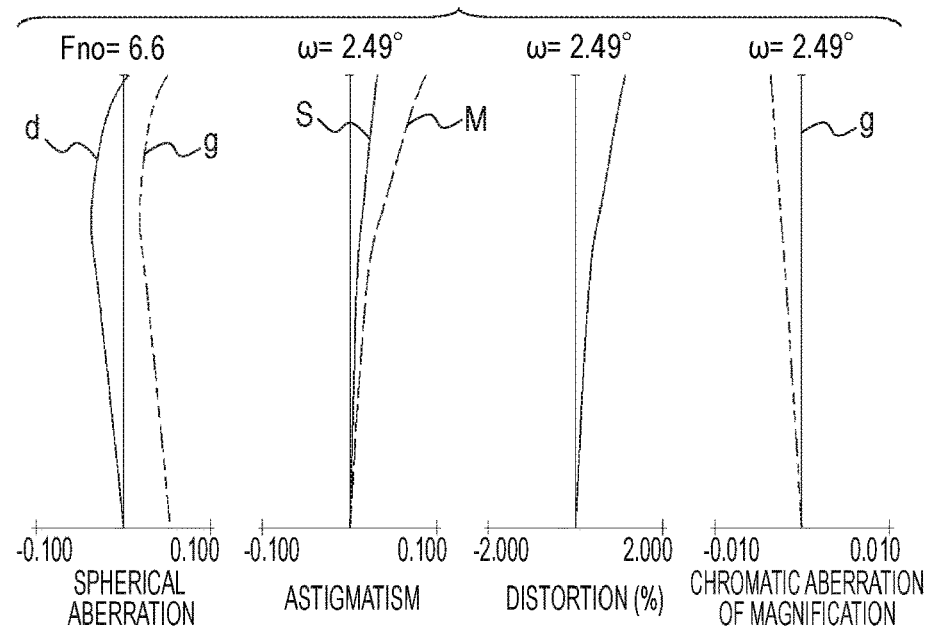
FIG. 9A is a longitudinal aberration diagram of Embodiment 3 at a telephoto end.
Figure 9B:
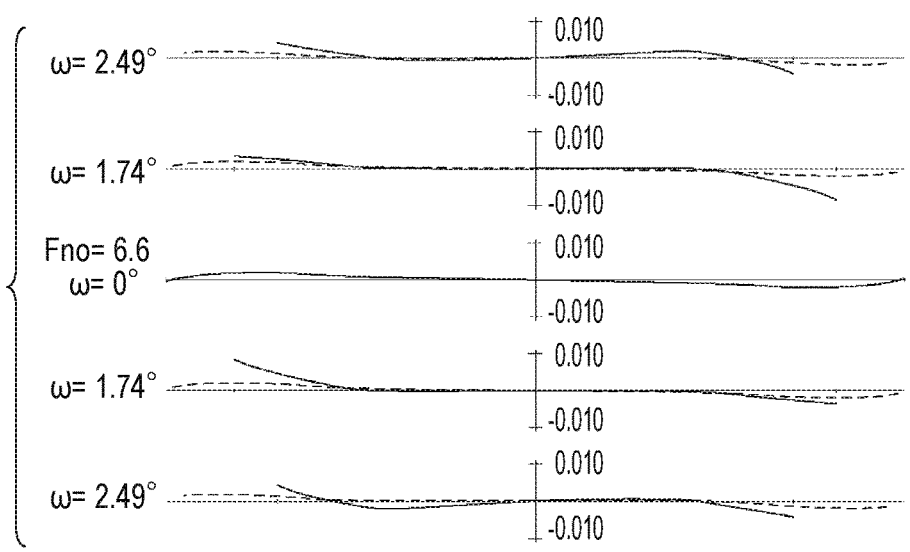
FIG. 9B is a lateral aberration diagram of Embodiment 3 at the telephoto end.
Figure 9C:
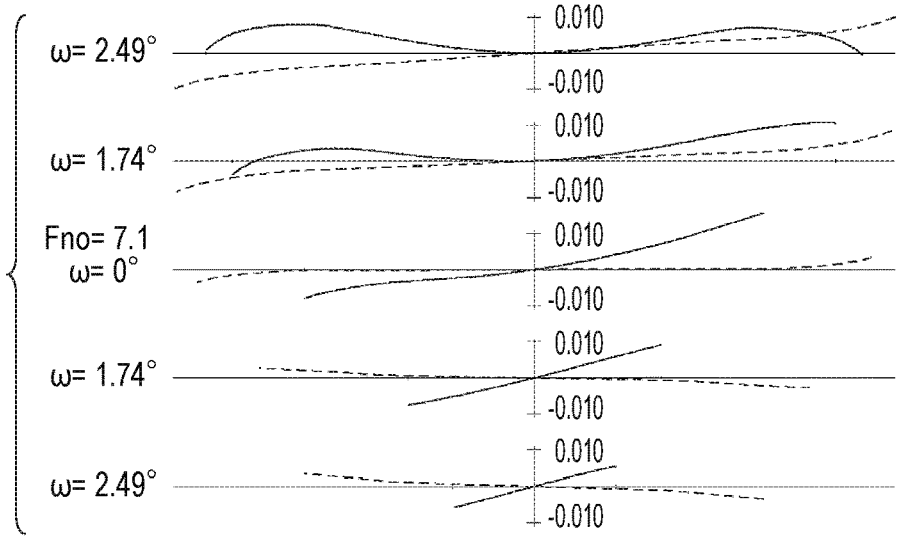
FIG. 9C is a lateral aberration diagram of Embodiment 3 at the telephoto end obtained during image stabilization with an image stabilization angle of −1.5 degrees.

FIG. 9A, FIG. 9B, and FIG. 9C are a longitudinal aberration diagram of Embodiment 3 (Numerical Data 3) of the disclosure at a telephoto end, a lateral aberration diagram of Embodiment 3 at the telephoto end, and a lateral aberration diagram of Embodiment 3 at the telephoto end obtained during image stabilization with an image stabilization angle of −1.5 degrees, respectively. Embodiment 3 relates to a zoom lens having a zoom ratio of 4.95 and an aperture ratio of from about 5.60 to about 6.60.

Figure 10:
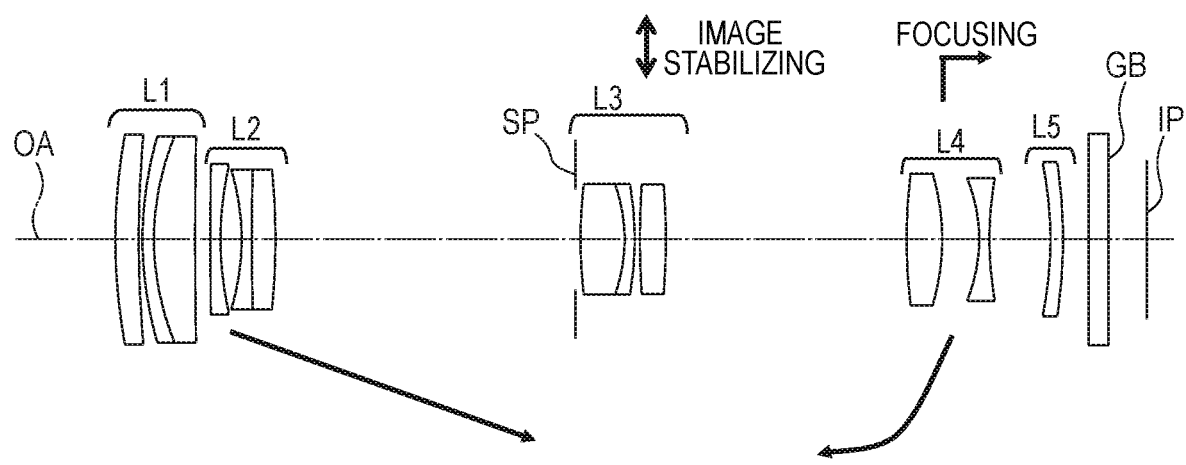
FIG. 10 is a lens cross-sectional view of a zoom lens according to Embodiment 4 of the disclosure at a wide-angle end.

FIG. 10 is a lens cross-sectional view of a zoom lens according to Embodiment 4 of the disclosure at a wide-angle end.

Figure 11A:
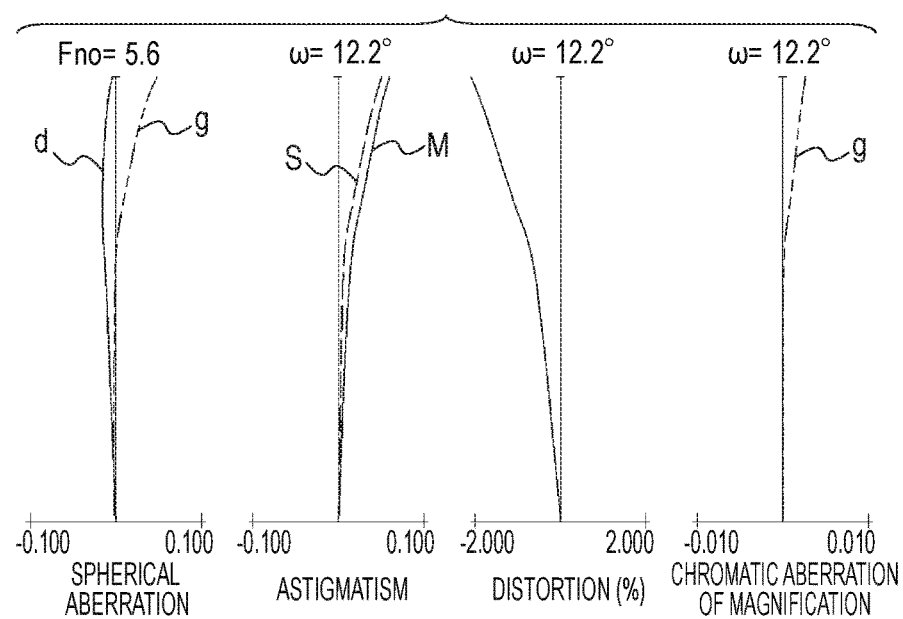
FIG. 11A is a longitudinal aberration diagram of Embodiment 4 at the wide-angle end.
Figure 11B:
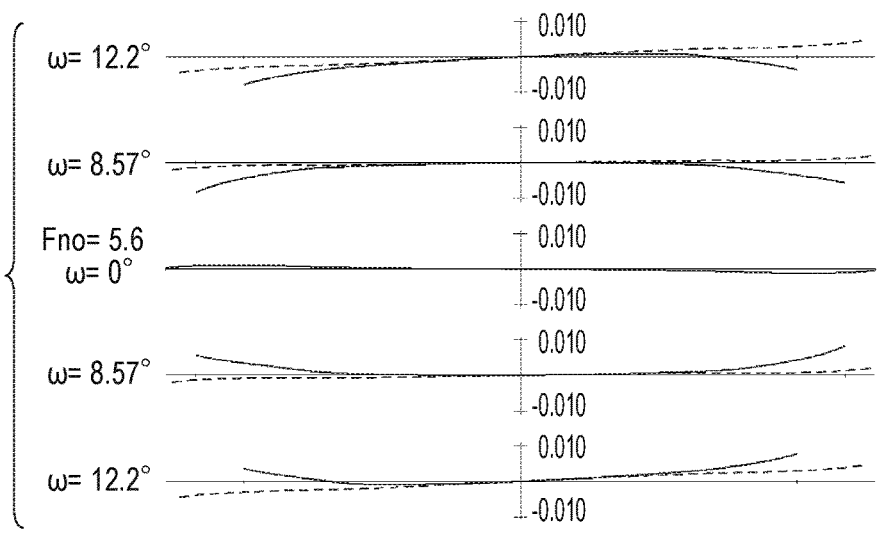
FIG. 11B is a lateral aberration diagram of Embodiment 4 at the wide-angle end.
Figure 11C:
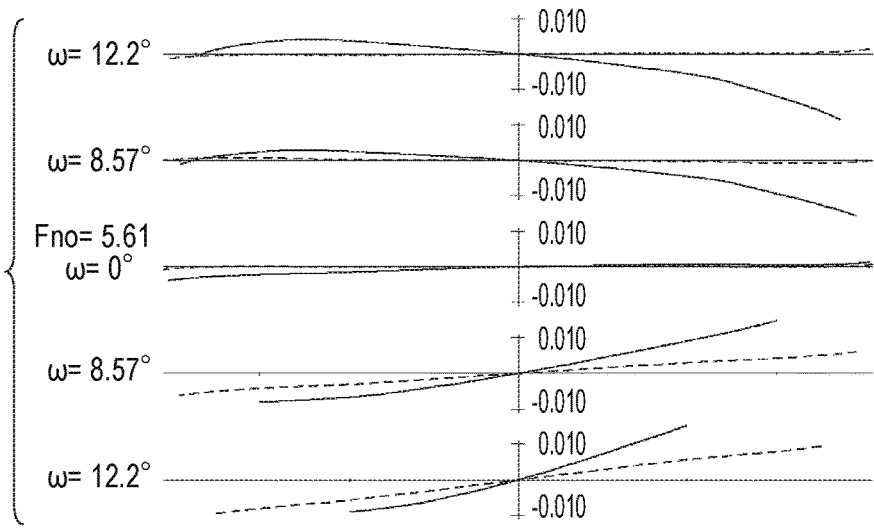
FIG. 11C is a lateral aberration diagram of Embodiment 4 at the wide-angle end obtained during image stabilization with an image stabilization angle of −3.0 degrees.

FIG. 11A, FIG. 11B, and FIG. 11C are a longitudinal aberration diagram of Embodiment 4 (Numerical Data 4) of the disclosure at the wide-angle end, a lateral aberration diagram of Embodiment 4 at the wide-angle end, and a lateral aberration diagram of Embodiment 4 at the wide-angle end obtained during image stabilization with an image stabilization angle of −3.0 degrees, respectively.

Figure 12A:
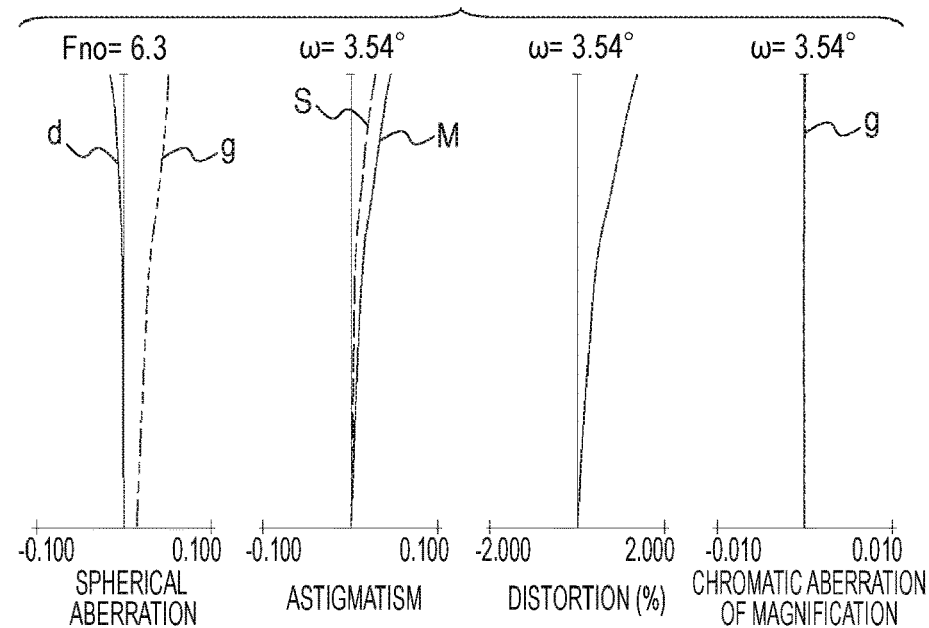
FIG. 12A is a longitudinal aberration diagram of Embodiment 4 at a telephoto end.
Figure 12B:
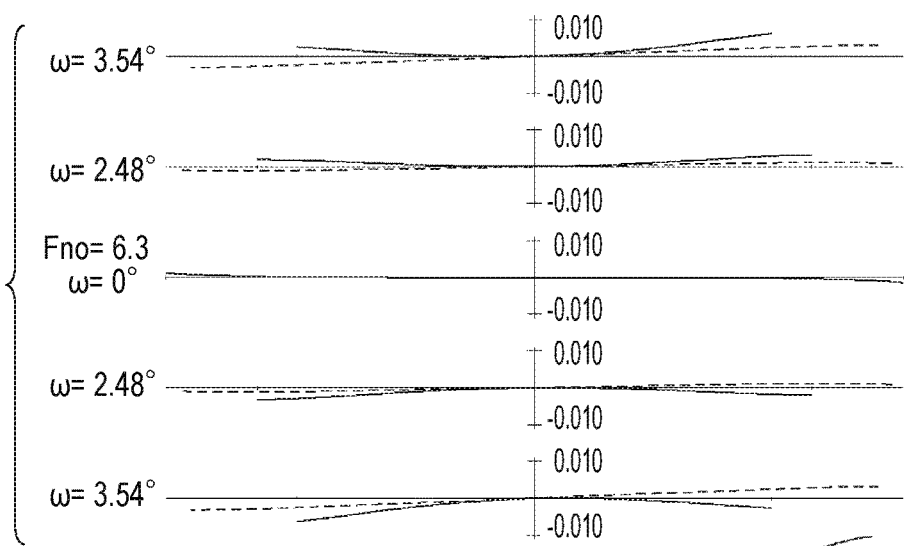
FIG. 12B is a lateral aberration diagram of Embodiment 4 at the telephoto end.
Figure 12C:
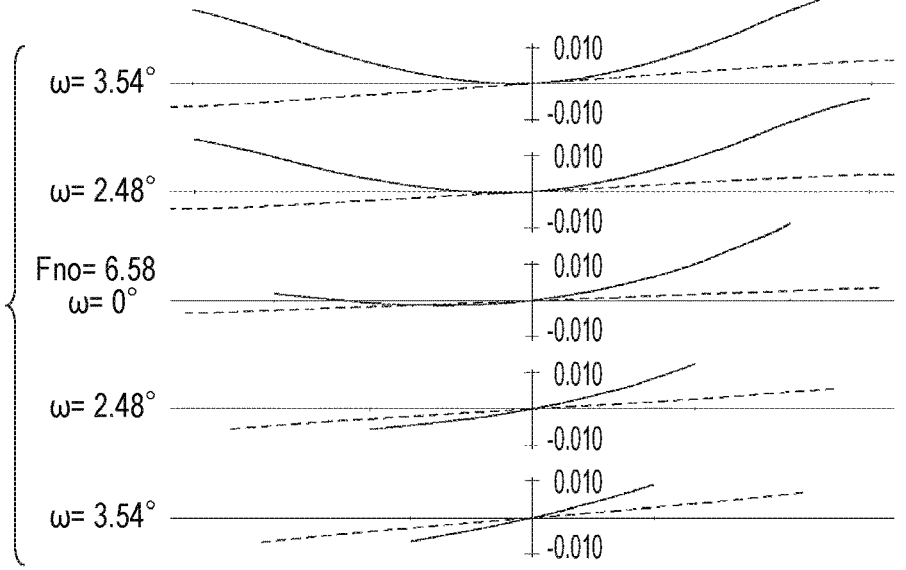
FIG. 12C is a lateral aberration diagram of Embodiment 4 at the telephoto end obtained during image stabilization with an image stabilization angle of −1.5 degrees.

FIG. 12A, FIG. 12B, and FIG. 12C are a longitudinal aberration diagram of Embodiment 4 (Numerical Data 4) of the disclosure at a telephoto end, a lateral aberration diagram of Embodiment 4 at the telephoto end, and a lateral aberration diagram of Embodiment 4 at the telephoto end obtained during image stabilization with an image stabilization angle of −1.5 degrees, respectively. Embodiment 4 relates to a zoom lens having a zoom ratio of 3.48 and an aperture ratio of from about 5.60 to about 6.30.

Figure 13:
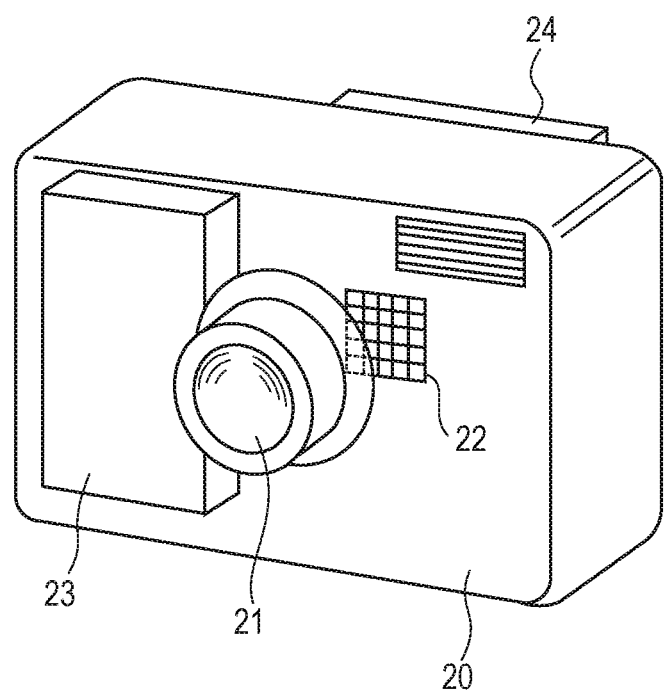
FIG. 13 is a schematic view of an image pickup apparatus according to an Embodiment of the disclosure.

FIG. 13 is a schematic view of a main part of an image pickup apparatus according to an Embodiment of the disclosure.

In the lens cross-sectional views of Embodiment 1 of FIG. 1 and Embodiment 2 of FIG. 4, a first lens unit L1 having a positive refractive power, a second lens unit L2 having a negative refractive power, a third lens unit L3 having a positive refractive power, and a fourth lens unit LA having a negative refractive power are illustrated.

The second lens unit L2 and the fourth lens unit L4 are configured to move along mutually different loci for zooming. At the telephoto end as compared to the wide-angle end, the second lens unit L2 is configured to move toward an image side, and the fourth lens unit L4 is configured to move toward an object side. Further, during focusing from infinity to close distance, the fourth lens unit L4 is configured to move toward the image side.

Further, the third lens unit L3 is moved (shifted) in a direction having a component perpendicular to an optical axis to perform image stabilization.

In the lens cross-sectional views of Embodiment 3 of FIG. 7, a first lens unit L1 having a positive refractive power, a second lens unit L2 having a negative refractive power, a third lens unit L3 having a positive refractive power, a fourth lens unit L4 having a negative refractive power, and a fifth lens L5 having a positive refractive power are illustrated.

In the lens cross-sectional views of Embodiment 4 of FIG. 10, a first lens unit L1 having a positive refractive power, a second lens unit L2 having a negative refractive power, a third lens unit L3 having a positive refractive power, a fourth lens unit L4 having a negative refractive power, and a fifth lens unit L5 having a negative refractive power are illustrated.

In Embodiment 3 and Embodiment 4, the second lens unit L2 and the fourth lens unit L4 are configured to move along mutually different loci for zooming. At the telephoto end as compared to the wide-angle end, the second lens unit L2 is configured to move toward an image side, and the fourth lens unit L4 is configured to move toward an object side. Further, during focusing from infinity to close distance, the fourth lens unit L4 is configured to move toward the image side.

Further, the third lens unit L3 is moved (shifted) in a direction having a component perpendicular to an optical axis to perform image stabilization.

In the lens cross-sectional views, an optical block GB, for example, an optical low-pass filter or an infrared cut filter, is illustrated. At an image plane IP, an image pickup surface of an image pickup element (photoelectric conversion element), for example, a CCD sensor or a CMOS sensor, is arranged when the zoom lens is used as an image pickup optical system of a video camera or a digital still camera. An f-number determining member (aperture stop) SP serves as an aperture stop configured to determine (restrict) a light flux at the open f-number (Fno). An optical axis OA is also illustrated.

In spherical aberration diagrams of the longitudinal aberration diagrams, the solid line "d" indicates a d-line (wavelength: 587.6 mm), and the two-dot chain line "g" indicates a g-line (wavelength: 435.8 mm). In astigmatism diagrams, the broken line M indicates a meridional image plane, and the solid line S indicates a sagittal image plane. In chromatic-aberration-of-magnification diagrams, the two-dot chain line "g" is shown for the g-line.

Further, the lateral aberration diagrams show aberrations at respective image heights, and are aberration diagrams of the d-line at image heights of +100%, +70%, center, −70%, and −100% in order from the above. The broken line indicates a sagittal image plane, and the solid line indicates a meridional image plane.

The zoom lens of each of Embodiment 1 and 2 includes, in order from the object side to the image side, a first lens unit L1 having a positive refractive power, a second lens unit L2 having a negative refractive power, a third lens unit L3 having a positive refractive power, and a fourth lens unit LA having a negative refractive power.

The zoom lens of each of Embodiment 3 and 4 include, in order from the object side to the image side, a first lens unit L1 having a positive refractive power, a second lens unit L2 having a negative refractive power, a third lens unit L3 having a positive refractive power, and a fourth lens unit L4 having a negative refractive power. The zoom lens further includes a fifth lens unit L5 having a positive or negative refractive power arranged adjacent to, and on the image side of, the fourth lens unit LA. The fifth lens unit L5 has a positive refractive power in Embodiment 3, and the fifth lens unit L5 has a negative refractive power in Embodiment 4.

By adopting the above-mentioned lens configuration, the entire zoom lens has a compact and simple configuration, and achieves a high zoom ratio and good optical performance.

Further, in the zoom lens of each of Embodiment, the first lens unit L1 is configured not to move with respect to the image plane for zooming. With this configuration, it is not required to drive the first lens unit L1, which tends to be increased in size, in particular, and a driving mechanism is simplified.

In each of Embodiment, the following inequalities are satisfied:

$$0.30 < DT/fT < 0.85 \tag{1};$$

$$0.02 < BW/DW < 0.14 \tag{2; and}$$

$$0.145 < f3/fT < 0.450 \tag{3},$$

where DT is a total length (value obtained by adding a value of an air-equivalent back focus to a distance from the first lens surface to the last lens surface) of the zoom lens at the telephoto end, fT is a focal length of the zoom lens at the telephoto end, BW is a distance of the back focus at the wide-angle end, DW is a total length of the zoom lens at the wide-angle end, and f3 is a focal length of the third lens unit L3.

Next, the technical meanings of the above-mentioned inequalities are described.

When the ratio of the inequality (1) exceeds the upper limit value of the inequality (1), a value of the total length DT of the zoom lens becomes much larger, and the entire zoom lens is increased in size. When the ratio falls below the lower limit value of the inequality (1), the value of the total length DT of the zoom lens becomes much smaller, and refractive powers of the respective lens units become much stronger (absolute values of refractive powers becomes much larger), with the result that it becomes difficult to correct various aberrations.

When the ratio of the inequality (2) exceeds the upper limit value of the inequality (2), a value of the back focus BW becomes much larger, and the entire zoom lens is increased in size. When the ratio falls below the lower limit value of the inequality (2), the value of the back focus BW becomes much smaller, and the zoom lens and the image pickup surface tend to interfere with each other.

When the ratio of the inequality (3) exceeds the upper limit value of the inequality (3), a value of the focal length f3 of the third lens unit L3 becomes much larger, and the positive refractive power of the third lens unit L3 becomes much weaker, with the result that the entire zoom lens is increased in size. When the ratio falls below the lower limit value of the inequality (3), the value of the focal length f3 becomes much smaller, and the positive refractive power of the third lens unit L3 becomes much stronger, with the result that it becomes difficult to correct spherical aberration and comatic aberration. Alternatively, when the third lens unit L3 is moved (shifted) in a direction perpendicular to the optical axis to perform image stabilization, it becomes difficult to correct decentering aberration.

In each of Embodiment, the numerical ranges of the inequality (1) to the inequality (3) are set as follows.

$$0.32 < DT/fT < 0.85 \tag{1a}$$

$$0.03 < BW/DW < 0.13 \tag{2a}$$

$$0.150 \le f3/fT < 0.430 \tag{3a}$$

Moreover, in each of Embodiment, the numerical ranges of the inequality (1a) to the inequality (3a) are set as follows.

$$0.35 < DT/fT < 0.84 \quad (1b)$$

$$0.04 < BW/DW < 0.12 \quad (2b)$$

$$0.155 < f3/fT < 0.400 \quad (3b)$$

In each of the Embodiment, one or more of the following inequalities are satisfied:

$$-2.0 < f3/f4 < -0.4 \quad (4)$$

$$0.31 < f3/f1 < 0.80 \quad (5)$$

$$-1.50 < f3/f2 < -0.70 \quad (6)$$

$$-0.60 < f4/fT < -0.08 \quad (7)$$

where f4 is a focal length of the fourth lens unit L4, f1 is a focal length of the first lens unit L1, and f2 is a focal length of the second lens unit L2.

Next, the technical meanings of the above-mentioned inequalities are described.

When the ratio of the inequality (4) exceeds the upper limit value of the inequality (4), the value of the focal length f3 becomes much smaller, and the positive refractive power of the third lens unit L3 becomes much stronger, with the result that it becomes difficult to correct spherical aberration and comatic aberration. Alternatively, when the third lens unit L3 is moved (shifted) in the direction having the component perpendicular to the optical axis to perform image stabilization, it becomes difficult to correct decentering aberration. When the ratio falls below the lower limit value of the inequality (4), the value of the focal length f3 becomes much larger, and the positive refractive power of the third lens unit L3 becomes much weaker, with the result that the entire zoom lens is increased in size.

When the ratio of the inequality (5) exceeds the upper limit value of the inequality (5), the value of the focal length f3 becomes much larger, and the positive refractive power of the third lens unit L3 becomes much weaker, with the result that the entire zoom lens is increased in size. When the ratio falls below the lower limit value of the inequality (5), the value of the focal length f3 becomes much smaller, and the positive refractive power of the third lens unit L3 becomes much stronger, with the result that it becomes difficult to correct spherical aberration and comatic aberration. Alternatively, when the third lens unit L3 is moved (shifted) in the direction having the component perpendicular to the optical axis to perform image stabilization, it becomes difficult to correct decentering aberration.

When the ratio of the inequality (6) exceeds the upper limit value of the inequality (6), the value of the focal length f3 becomes much smaller, and the positive refractive power of the third lens unit L3 becomes much stronger, with the result that it becomes difficult to correct spherical aberration and comatic aberration. Alternatively, when the third lens unit L3 is moved (shifted) in the direction having the component perpendicular to the optical axis to perform image stabilization, it becomes difficult to correct decentering aberration. When the ratio falls below the lower limit value of the inequality (6), the value of the focal length f3 becomes much larger, and the positive refractive power of the third lens unit L3 becomes much weaker, with the result that the entire zoom lens is increased in size.

When the ratio of the inequality (7) exceeds the upper limit value of the inequality (7), the absolute value of the focal length f4 becomes much smaller, and the negative refractive power of the fourth lens unit L4 becomes much stronger, with the result that it becomes difficult to correct curvature of field and distortion. Alternatively, variations in various aberrations caused when the fourth lens unit L4 is moved along the optical axis to perform focusing becomes much larger. When the ratio falls below the lower limit value of the inequality (7), the absolute value of the focal length f4 becomes much larger, and the negative refractive power of the fourth lens unit L4 becomes much weaker, with the result that the entire zoom lens is increased in size.

Furthermore, in one Embodiment, the numerical ranges of the inequality (4) to the inequality (7) are set as follows.

$$-1.9 < f3/f4 < -0.5 \quad (4a)$$

$$0.32 < f3/f1 < 0.75 \quad (5a)$$

$$-1.40 < f3/f2 < -0.80 \quad (6a)$$

$$-0.55 < f4/fT < -0.09 \quad (7a)$$

Moreover, in one Embodiment, the numerical ranges of the inequality (4a) to the inequality (7a) are set as follows.

$$-1.8 < f3/f4 < -0.6 \quad (4b)$$

$$0.33 < f3/f1 < 0.70 \quad (5b)$$

$$-1.30 < f3/f2 < -0.90 \quad (6b)$$

$$-0.50 < f4/fT < -0.10 \quad (7b)$$

In each of Embodiment, a part or the whole of the third lens unit L3 is configured to move in the direction having the component perpendicular to the optical axis to perform image stabilization. With this configuration, it becomes easier to satisfactorily correct decentering aberration generated during the image stabilization.

The third lens unit L3 includes, in order from the object side to the image side, a cemented lens formed by cementing a positive lens and a negative lens, and a positive lens. With this configuration, spherical aberration and comatic aberration can be satisfactorily corrected, in particular. Alternatively, decentering aberration generated when the third lens unit L3 is moved (shifted) in the direction having the component perpendicular to the optical axis to perform image stabilization can be satisfactorily corrected.

In one embodiment, the third lens unit L3 include the aperture stop SP. With this configuration, the entire zoom lens can be made compact. Also, the third lens unit L3 is to be configured not to move with respect to the image plane for zooming. With this configuration, it becomes easier to simplify the driving mechanism configured to perform zooming.

In one embodiment, a part or the whole of the fourth lens unit L4 is to be configured to move along the optical axis to perform focusing. With this configuration, it becomes easier to suppress variations in various aberrations caused when the focusing is performed.

In one embodiment, the fourth lens unit L4 includes, in order from the object side to the image side, a positive lens and a negative lens. With this configuration, curvature of field and distortion can be satisfactorily corrected, in particular. Alternatively, it becomes easier to suppress the variations in various aberrations caused when the fourth lens unit L4 is moved along the optical axis to perform focusing.

As described above, according to each of Embodiment, the zoom lens having good image forming performance and good image stabilization with the compact and simple configuration can be obtained.

Next, referring to FIG. 13, a digital camera (image pickup apparatus) of an exemplary embodiment of the disclosure, which uses an image pickup optical system of each of Embodiment, is described. FIG. 13 is a schematic view of the image pickup apparatus.

In FIG. 13, the digital camera includes a digital camera main body 20 and a zoom lens (image pickup optical system) 21 of any one of Embodiment. An image pickup element (photoelectric conversion element) 22, for example, a CCD sensor or a CMOS sensor, is included in the digital camera main body 20 to receive an optical image (object image) formed by the image pickup optical system 21. A storage unit (memory) 23 records information corresponding to an object image that has been photoelectrically converted by the image pickup element 22. A display element (viewfinder) 24 is formed of a liquid crystal display panel or the like, and is used to observe the object image formed on the image pickup element 22.

Next, each of Numerical Embodiment, which correspond to each of Embodiment of the disclosure, respectively, is described. In each of Numerical Embodiment, Symbol "i" represents the order of a surface counted from the object side.

In each of Numerical Embodiment, Symbol ri represents a radius of curvature of an i-th lens surface in order from the object side. Symbol di represents a lens thickness and an air gap between an i-th surface and an (i+1)th surface in order from the object side. Symbols ndi and vdi represent a refractive index and an Abbe number with respect to the d-line of a material between the i-th surface and the (i+1)th surface in order from the object side, respectively.

Symbol BF is back focus, which is a value represented by an air-converted length from a final lens surface to a paraxial image plane. A total lens length is obtained by adding the length corresponding to the back focus BF to a distance from a forefront lens surface to the final lens surface.

The total length DT of the zoom lens at the telephoto end, the total length DW of the zoom lens at the wide-angle end, and the back focus BW at the wide-angle end described above also follow the above-mentioned definitions.

Moreover, a relationship between the conditional expressions described above and Embodiment is shown in Table 1.

(Numerical Data 1)

| Unit: mm | | | | |
|---|---|---|---|---|
| Surface data | | | | |
| Surface number | r | d | nd | vd |
| 1 | 19.782 | 1.32 | 1.60311 | 60.6 |
| 2 | 2,395.860 | 0.15 | | |
| 3 | 11.988 | 0.45 | 1.85478 | 24.8 |
| 4 | 8.835 | 1.49 | 1.48749 | 70.2 |
| 5 | 18.845 | (Variable) | | |
| 6 | 33.781 | 0.40 | 1.83481 | 42.7 |
| 7 | 12.163 | 0.85 | | |
| 8 | −12.234 | 0.40 | 1.83481 | 42.7 |
| 9 | 15.588 | 1.07 | 1.95906 | 17.5 |
| 10 | −311.585 | (Variable) | | |
| 11 (Stop) | ∞ | 0.20 | | |
| 12 | 23.038 | 2.08 | 1.48749 | 70.2 |
| 13 | −4.549 | 0.40 | 1.91082 | 35.3 |
| 14 | −8.641 | 1.36 | | |
| 15 | 80.454 | 1.30 | 1.48749 | 70.2 |
| 16 | −9.027 | (Variable) | | |
| 17 | −9.854 | 0.95 | 1.72825 | 28.5 |
| 18 | −6.514 | 1.79 | | |
| 19 | −5.228 | 0.40 | 1.77250 | 49.6 |
| 20 | −35.753 | (Variable) | | |
| 21 | ∞ | 0.80 | 1.51633 | 64.1 |
| 22 | ∞ | 1.50 | | |
| Image plane | ∞ | | | |

| Various data | | |
|---|---|---|
| Zoom ratio 3.97 | | |
| | Wide-angle end | Telephoto end |
| Focal length | 13.93 | 55.25 |
| F-number | 5.60 | 6.30 |
| Half angle of view (degrees) | 12.15 | 3.11 |
| Image height | 3.00 | 3.00 |
| Total lens length | 41.73 | 41.73 |
| BF | 4.43 | 11.23 |
| d5 | 0.78 | 12.15 |
| d10 | 12.12 | 0.75 |
| d16 | 9.80 | 3.00 |
| d20 | 2.40 | 9.20 |

| Lens unit data | | |
|---|---|---|
| Unit | First surface | Focal length |
| 1 | 1 | 26.90 |
| 2 | 6 | −9.80 |
| 3 | 11 | 11.22 |
| 4 | 17 | −12.70 |
| GB | 21 | ∞ |

| | |
|---|---|
| Image stabilizing lens unit: | Third lens unit |
| Image stabilization angle at the wide-angle end: | −3.0 degrees (shift amount: +0.364 mm) |
| Image stabilization angle at the telephoto end: | −1.5 degrees (shift amount: +0.679 mm) |
| Focus lens unit | Fourth lens unit |

(Numerical Data 2)

| Unit: mm | | | | |
|---|---|---|---|---|
| Surface data | | | | |
| Surface number | r | d | nd | vd |
| 1 | 18.951 | 1.29 | 1.60311 | 60.6 |
| 2 | 536.562 | 0.15 | | |
| 3 | 11.186 | 0.45 | 1.85478 | 24.8 |
| 4 | 8.281 | 1.34 | 1.48749 | 70.2 |
| 5 | 16.788 | (Variable) | | |
| 6 | 36.096 | 0.40 | 1.83481 | 42.7 |
| 7 | 13.545 | 0.79 | | |
| 8 | −12.399 | 0.40 | 1.83481 | 42.7 |
| 9 | 14.872 | 1.04 | 1.95906 | 17.5 |
| 10 | 309.176 | (Variable) | | |
| 11 (Stop) | ∞ | 0.20 | | |
| 12 | 13.225 | 1.99 | 1.48749 | 70.2 |
| 13 | −5.018 | 0.40 | 1.91082 | 35.3 |
| 14 | −10.057 | 0.23 | | |
| 15 | 85.124 | 1.14 | 1.48749 | 70.2 |
| 16 | −10.610 | (Variable) | | |
| 17 | −49.493 | 1.18 | 1.62588 | 35.7 |
| 18 | −7.924 | 1.43 | | |
| 19 | −5.636 | 0.40 | 1.77250 | 49.6 |
| 20 | 58.472 | (Variable) | | |
| 21 | ∞ | 0.80 | 1.51633 | 64.1 |
| 22 | ∞ | 1.50 | | |
| Image plane | ∞ | | | |

Unit: mm

Various data
Zoom ratio 3.48

|  | Wide-angle end | Telephoto end |
|---|---|---|
| Focal length | 13.93 | 48.50 |
| F-number | 5.60 | 6.30 |
| Half angle of view (degrees) | 12.15 | 3.54 |
| Image height | 3.00 | 3.00 |
| Total lens length | 38.73 | 38.73 |
| BF | 4.42 | 10.93 |
| d5 | 0.79 | 11.23 |
| d10 | 11.20 | 0.75 |
| d16 | 9.50 | 3.00 |
| d20 | 2.40 | 8.90 |

Lens unit data

| Unit | First surface | Focal length |
|---|---|---|
| 1 | 1 | 26.90 |
| 2 | 6 | −9.82 |
| 3 | 11 | 11.00 |
| 4 | 17 | −14.22 |
| GB | 21 | ∞ |

Image stabilizing lens unit: Third lens unit
Image stabilization angle at the wide-angle end: −3.0 degrees (shift amount: +0.383 mm)
Image stabilization angle at the telephoto end: −1.5 degrees (shift amount: +0.609 mm)
Focus lens unit: Fourth lens unit (Numerical Data 3)

Unit: mm

Surface data

| Surface number | r | d | nd | νd |
|---|---|---|---|---|
| 1 | 22.696 | 1.48 | 1.60311 | 60.6 |
| 2 | −582.068 | 0.15 | | |
| 3 | 12.233 | 0.45 | 1.85478 | 24.8 |
| 4 | 9.270 | 1.71 | 1.49700 | 81.5 |
| 5 | 19.153 | (Variable) | | |
| 6 | 343.667 | 0.40 | 1.83481 | 42.7 |
| 7 | 20.802 | 0.62 | | |
| 8 | −17.856 | 0.40 | 1.83481 | 42.7 |
| 9 | 9.575 | 1.09 | 1.95906 | 17.5 |
| 10 | 29.084 | (Variable) | | |
| 11 (Stop) | ∞ | 0.20 | | |
| 12 | 28.013 | 2.20 | 1.48749 | 70.2 |
| 13 | −4.516 | 0.40 | 1.91082 | 35.3 |
| 14 | −8.505 | 1.38 | | |
| 15 | 40.584 | 1.36 | 1.48749 | 70.2 |
| 16 | −9.242 | (Variable) | | |
| 17 | −12.013 | 1.01 | 1.72825 | 28.5 |
| 18 | −6.230 | 1.28 | | |
| 19 | −4.709 | 0.40 | 1.77250 | 49.6 |
| 20 | 44.234 | (Variable) | | |
| 21 | −101.818 | 1.09 | 1.48749 | 70.2 |
| 22 | −11.566 | 1.00 | | |
| 23 | ∞ | 0.80 | 1.51633 | 64.1 |
| 24 | ∞ | 1.50 | | |
| Image plane | ∞ | | | |

Various data
Zoom ratio 4.95

|  | Wide-angle end | Telephoto end |
|---|---|---|
| Focal length | 13.93 | 69.00 |
| F-number | 5.60 | 6.60 |
| Half angle of view (degrees) | 12.15 | 2.49 |
| Image height | 3.00 | 3.00 |
| Total lens length | 44.73 | 44.73 |
| BF | 3.03 | 3.03 |
| d5 | 1.12 | 14.02 |
| d10 | 13.65 | 0.75 |
| d16 | 9.50 | 3.00 |
| d20 | 1.81 | 8.31 |

Lens unit data

| Unit | First surface | Focal length |
|---|---|---|
| 1 | 1 | 27.78 |
| 2 | 6 | −9.29 |
| 3 | 11 | 10.97 |
| 4 | 17 | −8.79 |
| 5 | 21 | 26.66 |
| GB | 23 | ∞ |

Image stabilizing lens unit: Third lens unit
Image stabilization angle at the wide-angle end: −3.0 degrees (shift amount: +0.333 mm)
Image stabilization angle at the telephoto end: −1.5 degrees (shift amount: +0.810 mm)
Focus lens unit: Fourth lens unit (Numerical Data 4)

Unit: mm

Surface data

| Surface number | r | d | nd | νd |
|---|---|---|---|---|
| 1 | 22.738 | 0.92 | 1.60311 | 60.6 |
| 2 | 46.884 | 0.15 | | |
| 3 | 14.448 | 0.45 | 1.85478 | 24.8 |
| 4 | 10.573 | 1.63 | 1.48749 | 70.2 |
| 5 | 217.638 | (Variable) | | |
| 6 | 218.923 | 0.40 | 1.77250 | 49.6 |
| 7 | 12.813 | 0.84 | | |
| 8 | −9.498 | 0.40 | 1.77250 | 49.6 |
| 9 | 90.407 | 0.94 | 1.95906 | 17.5 |
| 10 | −27.553 | (Variable) | | |
| 11 (Stop) | ∞ | 0.20 | | |
| 12 | 17.920 | 1.74 | 1.60311 | 60.6 |
| 13 | −6.487 | 0.40 | 2.00100 | 29.1 |
| 14 | −12.550 | 0.20 | | |
| 15 | 30.857 | 1.03 | 1.48749 | 70.2 |
| 16 | −26.736 | (Variable) | | |
| 17 | 20.745 | 1.41 | 1.53172 | 48.8 |
| 18 | −9.069 | 1.46 | | |
| 19 | −6.370 | 0.40 | 1.69680 | 55.5 |
| 20 | 13.959 | (Variable) | | |
| 21 | −15.000 | 0.50 | 1.48749 | 70.2 |
| 22 | −20.000 | 1.00 | | |
| 23 | ∞ | 0.80 | 1.51633 | 64.1 |
| 24 | ∞ | 1.50 | | |
| Image plane | ∞ | | | |

Various data
Zoom ratio 3.48

|  | Wide-angle end | Telephoto end |
|---|---|---|
| Focal length | 13.93 | 48.50 |
| F-number | 5.60 | 6.30 |
| Half angle of view (degrees) | 12.15 | 3.54 |
| Image height | 3.00 | 3.00 |
| Total lens length | 40.43 | 40.43 |
| BF | 3.03 | 3.03 |

-continued

| Unit: mm | | |
|---|---|---|
| d5 | 0.60 | 11.68 |
| d10 | 11.83 | 0.75 |
| d16 | 9.49 | 3.00 |
| d20 | 2.41 | 8.91 |

| Lens unit data | | |
|---|---|---|
| Unit | First surface | Focal length |
| 1 | 1 | 27.47 |
| 2 | 6 | −10.03 |
| 3 | 11 | 11.96 |
| 4 | 17 | −18.67 |
| 5 | 21 | −127.25 |
| GB | 23 | ∞ |

| | |
|---|---|
| Image stabilizing lens unit: | Third lens unit |
| Image stabilization angle at the wide-angle end: | −3.0 degrees (shift amount: +0.377 mm) |
| Image stabilization angle at the telephoto end: | −1.5 degrees (shift amount: +0.589 mm) |
| Focus lens unit | Fourth lens unit |

TABLE 1

| | Conditional Expression (1) | Conditional Expression (2) | Conditional Expression (3) | Conditional Expression (4) | Conditional Expression (5) | Conditional Expression (6) | Conditional Expression (7) |
|---|---|---|---|---|---|---|---|
| Embodiment 1 | 0.755 | 0.106 | 0.203 | −0.884 | 0.417 | −1.146 | −0.230 |
| Embodiment 2 | 0.799 | 0.114 | 0.227 | −0.774 | 0.409 | −1.120 | −0.293 |
| Embodiment 3 | 0.648 | 0.068 | 0.159 | −1.248 | 0.395 | −1.180 | −0.127 |
| Embodiment 4 | 0.834 | 0.075 | 0.247 | −0.641 | 0.435 | −1.193 | −0.385 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-057699, filed Mar. 26, 2019, which is hereby incorporated by reference herein in its entirety.

What is claimed is:

1. A zoom lens comprising, in order from an object side to an image side:
   a first lens unit having a positive refractive power;
   a second lens unit having a negative refractive power;
   a third lens unit having a positive refractive power; and
   a fourth lens unit having a negative refractive power,
   wherein an interval between each pair of adjacent lens units is changed during zooming,
   wherein the first lens unit is configured not to move for zooming, and
   wherein the following inequalities are satisfied:

$0.30 < DT/fT < 0.85;$ $0.02 < BW/DW < 0.14;$ and $0.145 < f3/fT < 0.450,$ where DT is a total length of the zoom lens at a telephoto end, fT is a focal length of the zoom lens at the telephoto end, BW is a distance of a back focus at a wide-angle end, DW is a total length of the zoom lens at the wide-angle end, and f3 is a focal length of the third lens unit.

2. The zoom lens according to claim 1, wherein the following inequality is satisfied:

$-2.0 < f3/f4 < -0.4,$ where f4 is a focal length of the fourth lens unit.

3. The zoom lens according to claim 1, wherein the following inequality is satisfied:

$0.31 < f3/f1 < 0.80,$ where f1 is a focal length of the first lens unit.

4. The zoom lens according to claim 1, wherein the following inequality is satisfied:

$-1.50 < f3/f2 < -0.70,$ where f2 is a focal length of the second lens unit.

5. The zoom lens according to claim 1, wherein the following inequality is satisfied:

$-0.60 < f4/fT < -0.08,$ where f4 is a focal length of the fourth lens unit.

6. The zoom lens according to claim 1, wherein at least a part of the third lens unit is configured to move in a direction having a component perpendicular to an optical axis for image stabilization.

7. The zoom lens according to claim 1, wherein the third lens unit consists of, in order from the object side to the image side, a cemented lens formed by cementing a positive lens and a negative lens, and a positive lens.

8. The zoom lens according to claim 1, wherein the third lens unit includes an aperture stop.

9. The zoom lens according to claim 1, wherein the third lens unit is configured not to move for zooming.

10. The zoom lens according to claim 1, wherein at least a part of the fourth lens unit is configured to move for focusing.

11. The zoom lens according to claim 1, wherein the fourth lens unit consists of, in order from the object side to the image side, a positive lens and a negative lens.

12. The zoom lens according to claim 1, further comprising a fifth lens unit having one of a positive refractive power and a negative refractive power, which is arranged adjacent to, and on the image side of, the fourth lens unit.

13. An image pickup apparatus comprising:
   a zoom lens; and
   an image pickup element configured to receive an optical image formed through the zoom lens,
      the zoom lens including, in order from an object side to an image side:
         a first lens unit having a positive refractive power;
         a second lens unit having a negative refractive power;
         a third lens unit having a positive refractive power; and
         a fourth lens unit having a negative refractive power,
      wherein an interval between each pair of adjacent lens units is changed during zooming, wherein the first lens unit is configured not to move for zooming, and wherein the following inequalities are satisfied:

$0.30 < DT/fT < 0.85;$ $0.02 < BW/DW < 0.14;$ and $0.145 < f3/fT < 0.450,$ where DT is a total length of the zoom lens at a telephoto end, fT is a focal length of the zoom lens at the telephoto end, BW is a distance of a back focus at a wide-angle end, DW is a total length of the zoom lens at the wide-angle end, and f3 is a focal length of the third lens unit.

14. The image pickup apparatus according to claim 13, wherein in the zoom lens, the following inequality is satisfied:

$-2.0 < f3/f4 < -0.4,$ where f4 is a focal length of the fourth lens unit.

15. The image pickup apparatus according to claim 13, wherein in the zoom lens, the following inequality is satisfied:

$0.31 < f3/f1 < 0.80,$ where f1 is a focal length of the first lens unit.

16. The image pickup apparatus according to claim 13, wherein in the zoom lens, the following inequality is satisfied:

$-1.50 < f3/f2 < -0.70,$ where f2 is a focal length of the second lens unit.

17. The image pickup apparatus according to claim 13, wherein jn the zoom lens, the following inequality is satisfied:

$-0.60 < f4/fT < -0.08,$ where f4 is a focal length of the fourth lens unit.

18. The image pickup apparatus according to claim 13, wherein at least a part of the third lens unit is configured to move in a direction having a component perpendicular to an optical axis for image stabilization.

19. The image pickup apparatus according to claim 13, wherein the third lens unit includes, in order from the object side to the image side, a cemented lens formed by cementing a positive lens and a negative lens, and a positive lens.

20. The image pickup apparatus according to claim 13, wherein the third lens unit includes an aperture stop.

* * * * *